United States Patent
Couleur et al.

(10) Patent No.: US 10,256,728 B1
(45) Date of Patent: Apr. 9, 2019

(54) MULTIPHASE INTERLEAVED PULSE FREQUENCY MODULATION FOR A DC-DC CONVERTER

(71) Applicant: Apple Inc., Cupertino, CA (US)

(72) Inventors: Michael Couleur, Egern (DE); Fabio Ongaro, Munich (DE); Nikola Jovanovic, Reutlingen (DE); Frank Trautmann, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/850,407

(22) Filed: Dec. 21, 2017

(51) Int. Cl.
*H02M 3/158* (2006.01)
*H02M 1/08* (2006.01)

(52) U.S. Cl.
CPC .......... *H02M 3/1584* (2013.01); *H02M 1/08* (2013.01)

(58) Field of Classification Search
CPC ......... H02M 3/156; H02M 2001/0025; H02M 1/08; H02M 1/36; H02M 3/1584
USPC ........ 323/235, 266–268, 271–275, 282–288, 323/311, 312, 315, 317
See application file for complete search history.

(56) References Cited

U.S. PATENT DOCUMENTS

| | | | |
|---|---|---|---|
| 7,109,691 B2 | 9/2006 | Brooks | |
| 7,482,793 B2 * | 1/2009 | Stoichita | H02M 3/1563 323/271 |
| 7,859,233 B1 * | 12/2010 | Silva | H02M 1/36 323/222 |
| 9,270,165 B2 * | 2/2016 | Jang | H02M 3/1584 |
| 9,548,651 B2 * | 1/2017 | Guo | H02M 1/14 |
| 9,559,591 B2 | 1/2017 | Hang | |
| 9,627,976 B2 * | 4/2017 | Li | H02M 3/1584 |
| 9,647,556 B2 * | 5/2017 | Li | H02M 3/1584 |
| 2014/0253082 A1 * | 9/2014 | Swanson | H02M 3/156 323/284 |
| 2016/0211745 A1 | 7/2016 | Hang | |

* cited by examiner

*Primary Examiner* — Rajnikant Patel
(74) *Attorney, Agent, or Firm* — Meyertons, Hood, Kivlin, Kowert & Goetzel, P.C.

(57) ABSTRACT

An apparatus includes a plurality of pulse control circuits and a control circuit. A given pulse control circuit of the plurality of pulse control circuits may source a current pulse to the output power signal based on a comparison of a particular feedback signal of a plurality of feedback signals and a target voltage signal. The control circuit may offset a voltage level of each feedback signal of a first subset of the plurality of feedback signals. The first subset may exclude a first feedback signal. In response to a determination that a period of time has ended, the control circuit may offset a voltage level of each feedback signal of a second subset of the plurality of feedback signals. The second subset may include the first feedback signal and exclude a second feedback signal.

20 Claims, 7 Drawing Sheets

MULTIPHASE INTERLEAVED PULSE FREQUENCY MODULATION FOR A DC-DC CONVERTER

BACKGROUND

Technical Field

Embodiments described herein are related to the field of integrated circuit implementation, and more particularly to the implementation of voltage conversion circuits.

Description of the Related Art

Computing systems may include one or more systems-on-a-chip (SoC), each of which may integrate a number of different functions onto a single integrated circuit. Various SoCs and/or various functional blocks on a given SoC may utilize power signals of different voltage levels. Since computing systems may include a single power source with a given output voltage level, one or more voltage converters or voltage regulators may be used to generate the power signals of different voltage levels.

Voltage regulation circuits implemented in a given computing system may be designed according to one of various design styles and types. Types of circuits for converting a DC power signal with a first voltage to a DC power signal with a second voltage include linear regulators and switching regulators. Buck converters, sometimes also referred to as buck regulators, are one example of a switching regulator.

SUMMARY OF THE EMBODIMENTS

Various embodiments of a voltage conversion circuit are disclosed. Broadly speaking, an apparatus, a method, and design information specifying a design are contemplated in which the apparatus includes a plurality of pulse control circuits, and a control circuit. A given pulse control circuit of the plurality of pulse control circuits may be configured to source a current pulse to an output power signal based on a comparison of a particular feedback signal of a plurality of feedback signals and a target voltage signal. The control circuit may be configured to offset a voltage level of each feedback signal of a first subset of the plurality of feedback signals. The first subset may exclude a first feedback signal. In response to a determination that a period of time has ended, the control circuit may be configured to offset a voltage level of each feedback signal of a second subset of the plurality of feedback signals. The second subset may include the first feedback signal and exclude a second feedback signal.

In another embodiment, a method may include operations such as comparing a voltage level of an output of a regulator circuit to a reference voltage level to generate a target voltage level, as well as selecting a particular feedback signal of a plurality of feedback signals and a corresponding pulse control circuit of a plurality of pulse control circuits. Each of the plurality of feedback signals may be coupled to a respective input node of a respective one of the plurality of pulse control circuits. The method may also include adding a respective offset to a voltage level of each of the plurality of feedback signals except the particular feedback signal, and, based on a comparison of the voltage level of the particular feedback signal to the target voltage level, sourcing, by the corresponding pulse control circuit, a current pulse to a load circuit coupled to the output of the regulator circuit. In response to determining a period of time has elapsed, the method may further include adding a respective offset to the voltage level of the particular feedback signal, and removing the respective offset from a voltage level of a newly selected feedback signal coupled to a newly selected pulse control circuit of the plurality of pulse control circuits.

In one embodiment, design information may be stored on a non-transitory computer-readable storage medium. The design information may specify a design of at least a portion of a hardware integrated circuit in a format recognized by a semiconductor fabrication system that is configured to use the design information to produce the hardware integrated circuit according to the design information. The design information may specify that the hardware integrated circuit includes a plurality of pulse control circuits, and a control circuit. A given pulse control circuit of the plurality of pulse control circuits may be configured to source a current pulse to an output power signal based on a comparison of a particular feedback signal of a plurality of feedback signals and a target voltage signal. The control circuit may be configured to offset a voltage level of each feedback signal of a first subset of the plurality of feedback signals. The first subset may exclude a first feedback signal. In response to a determination that a period of time has ended, the control circuit may be configured to offset a voltage level of each feedback signal of a second subset of the plurality of feedback signals. The second subset may include the first feedback signal and exclude a second feedback signal.

BRIEF DESCRIPTION OF THE DRAWINGS

The following detailed description makes reference to the accompanying drawings, which are now briefly described.

Figure 1:
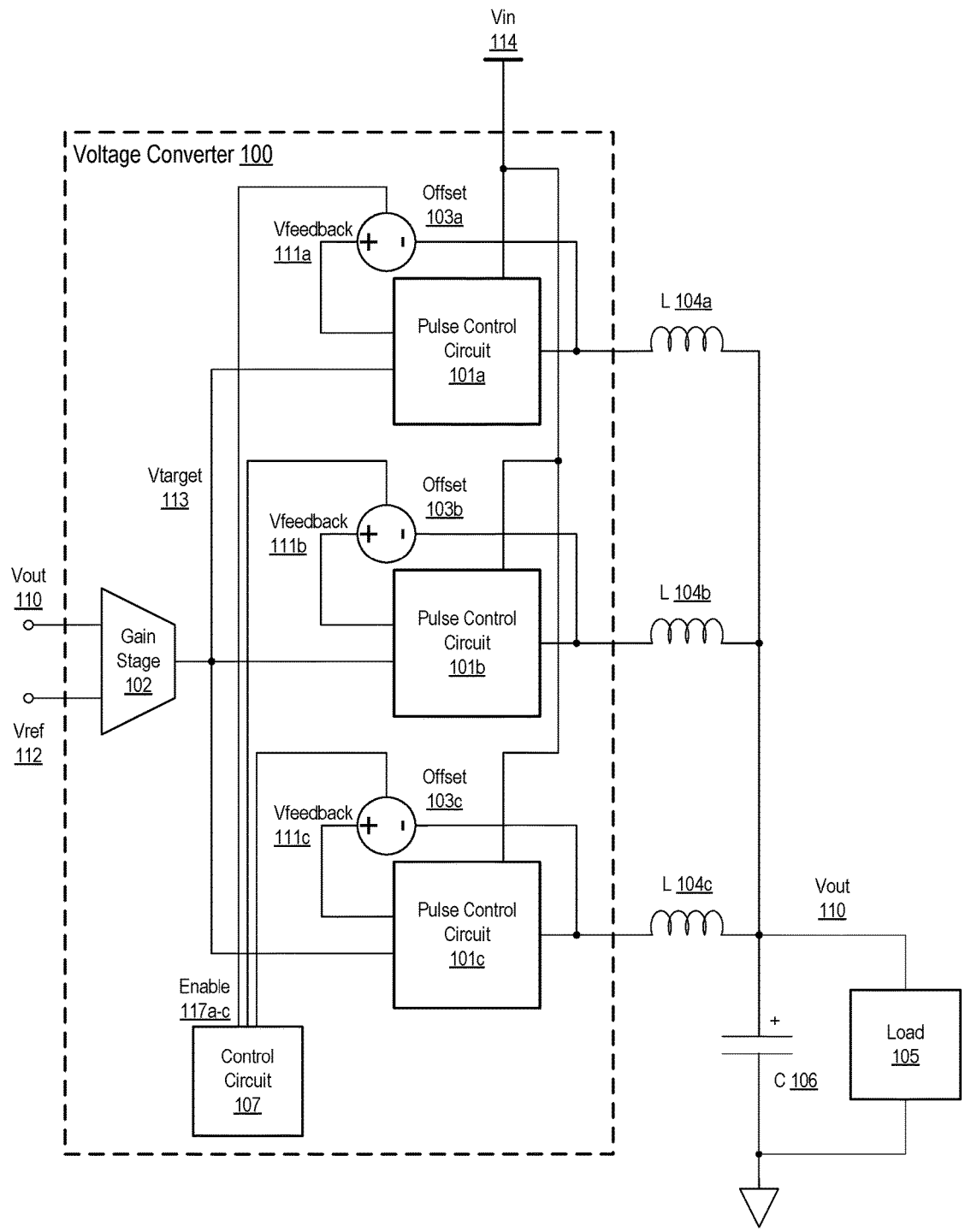
FIG. 1 illustrates a block diagram of an embodiment of a voltage converter.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Voltage conversion circuits may be found in many computing systems for providing a power supply signal of a particular voltage level to one or more integrated circuits (ICs) or to a subset of circuits in a given IC. Buck converters are one type of voltage conversion circuit that may be used to generate a power signal with a given voltage level. Buck converters receive an input power signal (Vin) and generate an output power signal (Vout) with a particular voltage level. To reduce the voltage level, for example, of Vin to a desired voltage level on Vout, a buck converter may couple Vin to Vout for given periods of time via a switching device, such as a transistor. Some voltage regulation systems may include multiple switching devices for producing a Vout power signal, with each switching device enabled during a different time phase, which may produce a more consistent voltage level on Vout and may be capable of responding more quickly to changes in current demand from the ICs.

A buck regulator may include a control circuit that generates a signal that enables and disables the transistor for the given amounts of time. Components such as, e.g., capacitors and inductors may be used to provide charge storage during the time periods in which the transistor is off. The voltage level of Vout may be dependent upon an average amount of time that the transistor is on versus off, referred to as the "on time," or "Ton." Pulse width modulation (PWM) is one method for generating the Ton signal enabling the transistor. This method works well when current demand of a load coupled to Vout is high. PWM control, however, may not meet an efficiency goal of the computing system when the current demand from the load is low. Pulse Frequency Modulation (PFM) is another method for generating the Ton signal which may provide better efficiency than PWM control when current demand from the load is low. PFM control, however, may not be as capable of supplying power when the current demand is high. Control schemes for managing a multi-phase voltage converter that changes from PFM to PWM control modes may be complex, particularly in a computing system that may have a wide range of power demands.

Various embodiments of voltage conversion circuits are described in this disclosure. The embodiments illustrated in the drawings and described below may provide techniques for converting a power signal within a computing system to a given voltage level when current demand on the power signal fluctuates between high and low levels.

A block diagram of an embodiment of a voltage converter is shown in FIG. 1. In the illustrated embodiment, Voltage Converter 100 includes Pulse Control Circuits 101a-101c, each coupled to a respective one of Offset Generators 103a-103c and a respective one of inductors L104a-L104c. Control Circuit 107 is coupled to each Offset Generator 103a-103c. A target voltage level is determined by Gain Stage 102 using input signals Vout 110 and Vref 112. One terminal of each of L104a-L104c is coupled together to generate an output signal Vout 110, which is supplied to Load circuit 105 and capacitor C106. In various embodiments, Voltage Converter 100 may be configured for use in various computing applications such as, e.g., desktop computers, laptop computers, tablet computers, smartphones, or wearable devices.

Gain Stage 102, in the illustrated embodiment, receives two input signals and produces an output signal based on the two signals. Gain Stage 102 compares a voltage level of Vout 110 to a voltage level of Vref 112 and generates Vtarget 113 based on the comparison. Vout 110 corresponds to an output power supply signal that is received by Load 105 and C106. Vref 112 may correspond to an output of any suitable voltage source capable of providing a reference voltage signal. In some embodiments, Vref 112 may correspond to a desired voltage level for Vout 110. Gain Stage 102 compares the voltage levels of Vout 110 and Vref 112 and generates Vtarget 113 with a voltage level that is based on a difference between the voltage levels of Vout 110 and Vref 112. Vtarget 113 is received by each of Pulse Control Circuits 101a-10c.

In the illustrated embodiment, Pulse Control Circuits 101a-101c receive Vtarget 113 as well as a respective one of Vfeedback signals 111a-111c. Based on a comparison of the voltage level of Vtarget 113 to a voltage level of a respective one of Vfeedback 111a-111c, each Pulse Control Circuit 101a-101c may source a current pulse, supplied from power supply signal Vin 114, that is provided to Load 105 via a respective one of L104a-L104c. The current is sourced in a series of pulses in order to generate a voltage level of Vout 110 that is based on the level of Vtarget 113. The more frequent or longer that the current pulses occur, the closer the voltage level of Vout 110 is to the voltage level of Vin 114. Voltage levels of Vfeedback signals 111a-111c correspond to the voltage levels of the respective outputs of Pulse Control Circuits 101a-101c. These feedback signals allow each of Pulse Control Circuits 101a-101c to compare their respective output voltages to the voltage level of Vtarget 113.

Each of Pulse Control Circuits 101a-101c are capable of operating in a PWM or a PFM mode. When current demand from Load 105 is low, each of Pulse Control Circuits 101a-101c operate in PFM mode, allowing for a more efficient generation of Vout 110 from Vin 114. In the PFM mode, each of Pulse Control Circuits 101a-101c generates a current pulse that is substantially the same duration. As current demand from Load 105 increases, a frequency of the current pulses may increase to source additional current to meet the increased demand, and vice versa if the current demand from Load 105 decreases. At a certain point, the current pulses that are generated in the PFM mode may start to run together and begin to resemble longer pulse widths. At this point, in some embodiments, Pulse Control Circuits 101a-101c may be switched to operate in the PWM mode. In the PWM mode, rather changing a frequency of the current pulses, the current pulses may be generated at a common interval with the current pulse width being increased or decreased to compensate for increased or decreased (respectively) current demand from Load 105.

In the illustrated embodiment, Offset Generators 103a-103c are capable of adding an amount of voltage to a respective one of the Vfeedback signals 111a-111c. By adding an amount of voltage to a particular Vfeedback signal 111a-111c, the corresponding Pulse Control Circuit 101a-101c detects a higher than actual output voltage on the respective Vfeedback 111a-111c. Due to the appearance of a higher output voltage, the corresponding Pulse Control Circuit 101a-101c may reduce a frequency of current pulses while operating in the PFM mode. Although positive offset voltages are shown and disclosed in the illustrated embodiments, a negative offset may be used in some embodiments, such as, a positive ground system, for example.

In some embodiments, current demand from Load 105 may be low enough that current pulses from just two, or even a single one of Pulse Control Circuits 101a-101c is adequate to support the desired voltage level. Disabling one or two of Pulse Control Circuits 101a-101c may result in the disabled Pulse Control Circuits 101a-101c needing some amount of time before being able to supply current to Load 105. For example, if Pulse Control Circuit 101b is disabled, then current through L104 b may fall to zero amps. Since inductive devices, by design, resist sudden changes in current, Pulse Control Circuit 101b may be delayed in providing current to Load 105 in response to a sudden increase in current demand.

Instead of turning Pulse Control Circuit 101b off, Offset Generator 103b may be used to temporarily prevent Pulse Control Circuits 101b from generating a current pulse by increasing the level of Vfeedback 111b such that a comparison circuit within Pulse Control Circuit 101b detects that the level of Vfeedback 111b is greater than the level of Vtarget 113, and therefore, a current pulse is not needed. By interleaving the operation of each of Offset Generators 103a-103c, the skipped current pulses may be distributed between each of the three Pulse Control Circuits 101a-101c, allowing only one or two to generate a current pulse at a given time, yet allowing each of Pulse Control Circuits 101a-101c to generate a current pulse and therefore maintain a flow of current through the corresponding L104a-L104c. In the illustrated embodiment, Control Circuit 107 provides each of control signals Enable 117a-117c to a respective one of Offset Generators 103a-103c, causing each of Pulse Control Circuits 101a-101c to skip one or more current pulses in a series of current pulses as determined based on current demand from Load 105.

In the illustrated embodiment, Control Circuit 107 applies an offset voltage to each of a subset of feedback signals, Vfeedback 111a-111c, except for a selected one. Control Circuit 107 applies the offset voltage by asserting Enable 117a-117c corresponding to each of Pulse Control Circuits 101a-101c that are associated with the subset of feedback signals. The Enable signal 117a-117c that corresponds to the selected Vfeedback 111a-111c is de-asserted, causing the respective Offset Generator 103a-103c to remove the offset, while the remaining Vfeedback 111a-111c each have a respective offset voltage added. In some embodiments, Control Circuit 107 includes one or more timing circuits capable of providing an indication of an end of a particular amount of time. After the particular amount of time elapses, Control Circuit 107 asserts the currently de-asserted Enable signal 117a-117c, thereby adding the offset voltage to the currently selected Vfeedback 111a-111c, and selects a new Vfeedback 111a-111c from the current subset of feedback signals by de-asserting a respective Enable signal 117a-117c, thereby removing the corresponding offset voltage from a newly selected Vfeedback 111a-111c. In some embodiments, the particular amount of time may be determined from when a respective Enable signal 117a-117c is last (i.e., most recently) asserted for a feedback signal of the current subset of feedback signals. A length of the particular amount of time may be based on a total number of Pulse Control Circuits included in Voltage Converter 100.

Control Circuit 107 may also control when each of Pulse Control Circuits 101a-101c enter PWM mode or PFM mode. In various embodiments, Control Circuit 107 may correspond to a separate block of circuitry as shown, or may correspond to circuits distributed to each of Pulse Control Circuits 101a-101c.

Inductors L104a-L104c may correspond to any suitable type of inductive device. Each of L104a-L104c may, in some embodiments, correspond to a discrete component, such as, for example, a wire coiled around a magnetic core, or a magnetic film wrapped around a length of wire. Discrete inductors L104a-L104c may be coupled to Voltage Converter 100 via, bond pads, terminals, or input/output pins. In other embodiments, inductors L104a-L104c may be fabricated on a same IC as Voltage Converter 100.

Load 105 receives Vout 110, in the illustrated embodiment, as a power supply signal. Load 105 may correspond to any active or passive circuit, including, but not limited to, a processor, a system-on-a-chip (SoC), an RF transceiver, a sensor (e.g., light sensor, touch sensor, gyroscopic sensor, temperature sensor, and the like), or a combination thereof. At any given time, Load 105 may consume one of a variety of currents, depending on a current state of operation. If, for example, Load 105 corresponds to an SoC, then Load 105 may consume a small amount of current while in a reduced power state and a much larger amount of current when in a fully active state. During a current pulse, C106 may charge if the current demand from Load 105 is less than a combined current passing through inductors L104a-L104c. If Load 105 is drawing more current than is flowing through inductors L104a-L104c combined, then the additional current may temporarily be provided by C106.

It is noted that the voltage converter illustrated in FIG. 1 is merely an example. Only components necessary to demonstrate the disclosed concepts are shown in FIG. 1. Additional and/or different components may be included in other embodiments, along with different configurations of the components. Although three pulse control circuits (as well as corresponding offset generators and inductors) are included in FIG. 1, any suitable number may be included as suitable to meet requirements for a particular application.

It is also noted that the embodiments illustrated and described herein may employ complementary metal-oxide-semiconductor (CMOS) circuits. In various other embodiments, however, other suitable technologies may be employed.

Figure 2:
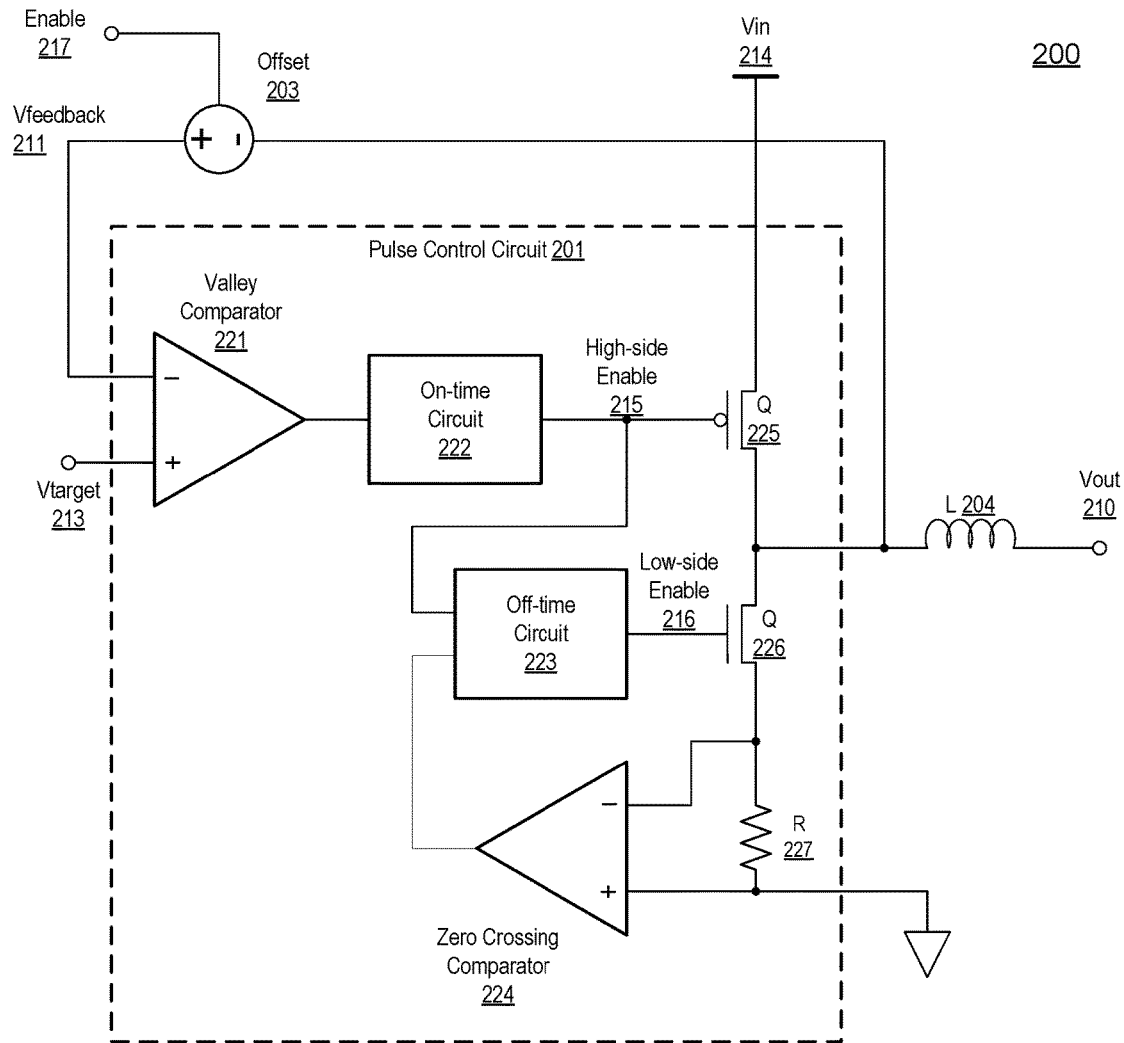
FIG. 2 shows a block diagram of an embodiment of a pulse control circuit for a voltage converter.

One instance of a pulse control circuit is shown in FIG. 2. In some embodiments, Pulse Control Circuit 201 may correspond to one of Pulse Control Circuits 101a-101c in FIG. 1. Pulse Control Circuit 201 includes Valley Comparator 221 coupled to On-time Circuit 222, which, in turn, is coupled to Off-time Circuit 223 and transconductive device Q225. Off-time Circuit is coupled to Zero Crossing Comparator 224, which is coupled to resistive device R227 and transconductance device Q226. Pulse Control Circuit 201 is coupled to Offset Generator 203 and inductive device L204 each of which may correspond to similarly named and numbered components in FIG. 1. Pulse Control Circuit 201 receives signals Vtarget 213 and Vin 214 as inputs. Vfeedback 211 is generated as an output of Pulse Control Circuit 201, and also received at an input terminal of Valley Comparator 221.

As used herein, "transconductive device" refers to a device such as a transistor, for example, that provides a particular amount of conductance between input and output nodes based on a voltage level of a control node. In FIG. 2, CMOS transistors are used as transconductive devices. In other embodiments, however, any suitable transconductive device (e.g., bi-polar junction transistors) may be used.

In the illustrated embodiment, Pulse Control Circuit 201 sources or supplies current to L204 dependent on signals High-side Enable 215 and Low-side Enable 216, respectively. Q225 receives Vin 214. Based on outputs of On-time Circuit 222 and Off-time Circuit 223, Q225 and Q226 are alternatively enabled. Q225 may be referred to as a high-side driver since it couples L204 to Vin 214, thereby increasing a voltage level of Vout 210. In contrast, Q226 may be referred to as a low-side driver, coupling L204 to a ground signal (via R227), and as a result, reducing the voltage level of Vout 210. By alternating between high-side driver Q225 and low-side driver Q226, a given voltage level between Vin 214 and the ground signal may be generated on Vout 210. A given time period in which Q225 is enabled, is referred to herein as an "on time" or "Ton," during which current is sourced via L204. The current that is sourced through L204 is referred to herein as a "current pulse." A given time period in which Q226 is enabled is referred to as an "off time" or "Toff," during which current removed from via L204. A ratio of Ton to Toff may determine the voltage level of Vout 210.

Some terms commonly used in reference to SoC designs and CMOS circuits are used in this disclosure. For the sake of clarity, it is noted that "high" or "high state" refers to a voltage sufficiently large to turn on a n-channel metal-oxide semiconductor field-effect transistor (MOSFET) and turn off a p-channel MOSFET while "low" or "low state" refers to a voltage that is sufficiently small enough to do the opposite. In other embodiments, different technology may result in different voltage levels for "low" and "high."

On-time Circuit 222 and Off-time Circuit 223, in the illustrated embodiment, control the signals High-side Enable 215 and Low-side Enable 216, respectively. On-time Circuit 222 receives the output of Valley Comparator 221 and bases assertion of High-side Enable 215 on a state of this output. If a voltage level of Vfeedback 211 falls below a voltage level of Vtarget 213, then Valley Comparator 221 asserts its output. On-time Circuit 222, in response to the assertion of the output, may, dependent on other logic signals, drive High-side Enable 215 to a low state, thereby enabling Q225 and coupling Vout 210 to Vin 214 via L204. In parallel, Off-time Circuit 223 receives High-side Enable 215 and drives Low-side Enable 216 low, which disables Q226. As a voltage level of Vfeedback 211 rises, Valley Comparator 221 de-asserts its output once the level of Vtarget 213 is determined to be less than the level of Vfeedback 211. Depending on an operating mode of Pulse Control Circuit 201, PFM or PWM, On-time Circuit 222 may or may not utilize the de-asserted output of Valley Comparator 221 for driving High-side Enable 215 high, thereby disabling Q225. In PFM mode, On-time Circuit 222 may drive High-side Enable 215 high after a particular amount of time, thereby generating a series of current pulses of similar duration each time the level of Vfeedback 211 falls below the level of Vtarget 213.

When High-side Enable 215 is driven high, Off-time Circuit 223 may drive Low-side Enable 216 low, thereby enabling Q226 and coupling L204 to the ground reference. Zero Crossing Comparator 224, in the illustrated embodiment, measures a current through Q226 based on a voltage level across R227. Other embodiments may utilize other methods for measuring current through Q226. When the current reaches a threshold amount, Zero Crossing Comparator 224 asserts its output and Off-time Circuit 223 may, depending on an operating mode of Pulse Control Circuit 201, drive Low-side Enable 216 low, thereby disabling Q226.

As described above in regards to FIG. 1, an offset voltage may be added to Vfeedback 211 to influence when Valley Comparator 221 asserts its output, and therefore, when On-time Circuit 222 enables Q225 again. In one embodiment, Enable signal 217, when asserted, causes Offset Generator 203 to add an offset voltage level to Vfeedback 211, thereby increasing the voltage level of Vfeedback 211. Since Valley Comparator 221 asserts its output in response to a voltage level of Vfeedback 211 dropping below the voltage level of Vtarget 213, increasing the voltage level of Vfeedback 211 may delay or prevent Valley Comparator 221 from asserting its output signal, and, subsequently, preventing On-time Circuit 22 from enabling Q225. By asserting and de-asserting Enable 217, Pulse Control Circuit 201 may, respectively, be prevented and allowed to source a current pulse to L204.

It is noted that the system illustrated in FIG. 2 is merely an example. Additional components and functional circuits have been omitted for clarity. In other embodiments, additional functional circuits and different configurations of the circuits are contemplated dependent upon the specific application for which the circuits are intended.

Figure 3:
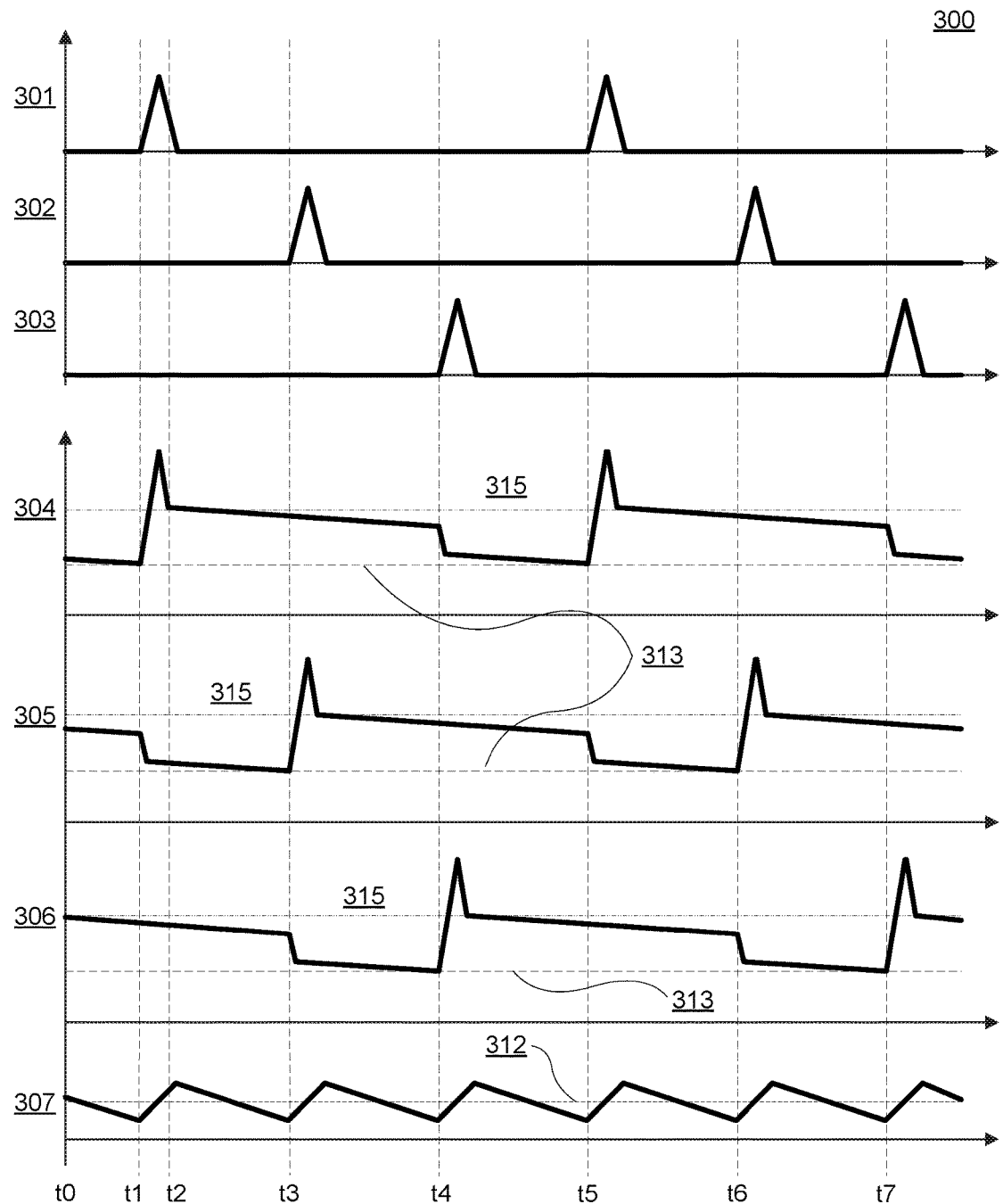
FIG. 3 depicts a chart depicting waveforms for an embodiment of a voltage converter.

Moving now to FIG. 3, a chart depicting waveforms related to an embodiment of a voltage converter is shown. Although the waveforms may be associated with other embodiments, the illustrated example corresponds to waveforms associated with Voltage Converter 100 in FIG. 1. Chart 300 includes seven waveforms. Current waveforms 301 through 303 depict Current (y-axis) through each of inductors L104a-L104c, respectively, over time (x-axis). Vfeedback waveforms 304 through 306 depict voltage levels (y-axis) of Vfeedback 111a-111c, respectively, versus time (x-axis). Vout waveform 307 shows the voltage level of Vout 110 versus time. In addition, three reference voltage levels (illustrated as dashed lines) are shown in waveforms 304-307, Vref 312, Vtarget 313, and Voffset 315.

In the illustrated embodiment, at time t0, Voltage Converter 100 is operating in PFM mode and a most recent current pulse has been provided by Pulse Control Circuit 101c. Enable signals 117b and 117c are asserted, causing Offset Generators 103b and 103c to apply Voffset 315 to both Vfeedback waveforms 305 and 306. Enable signal 117a is de-asserted, and, therefore, Voffset 315 is not applied to Vfeedback 304. At time t1, the voltage level of Vfeedback 304 falls below the level of Vtarget 313, causing Pulse Control Circuit 101a to generate a current pulse through L104a, as shown by Current 301. Due to the applied Voffset 315 on both Vfeedbacks 305 and 306, Pulse Control Circuits 101b and 101c do not generate current pulses at this time. It is noted that Vtarget is shown with a constant voltage level demonstrate the disclosed concepts. In other embodiments, the level of Vtarget 313 may vary over time corresponding with changes in Vout 307.

After time t1, Control Circuit 107, however, de-asserts Enable signal 117b, thereby removing Voffset 315 from Vfeedback 305. In various embodiments, Control Circuit 107 may de-assert Enable Signal 117b in response to the occurrence of time t1, or at a time other than time t1. At time t2, in the illustrated embodiment, Control Circuit 107 asserts Enable signal 117a, causing Offset Generator 103a to apply Voffset 315 to Vfeedback 304. In various embodiments, time t2 may correspond to an event, such as an end to the current pulse on Current 301, or a particular voltage level of Vout 307. In other embodiments, Control Circuit 107 may include a timing circuit for determining an elapsed time from time t1 or another event, to determine an occurrence of time t2.

Continuing the example of FIG. 3, at time t3, the voltage level of Vfeedback 305 falls below the level of Vtarget 313, causing Pulse Control Circuit 101b to generate a current pulse through L104b, as shown by Current 302. Due to assertions of Enable signals 117a and 117c, Vfeedback 304 and 306 remain above Vtarget 313, and, therefore, neither of Pulse Control Circuits 101a nor 101c generate current pulses. At a point after time t3, Control Circuit 107 de-asserts Enable signal 117c and asserts Enable signal 117b.

In the illustrated embodiment, at time t4, the voltage level of Vfeedback 306 falls below the level of Vtarget 313, this time causing Pulse Control Circuit 101c to generate a current pulse through L104c, as shown by Current 303. The other Pulse Control Circuits, 101a and 101b, do not generate current pulses due to the assertion of Enable signals 117a and 117b. Again, at some point after time t4, Control Circuit 107 de-asserts Enable signal; 117a and asserts Enable signal 117c. Although Chart 300 shows the assertion of Enable signal 117c occurring after the de-assertion of Enable signal 117a, in other embodiments, the order may be reversed, or both signal may transition at a same time.

The PFM process repeats through times t5-t7 while Voltage Converter 100 is active and remains in PFM mode. Operation of Voltage Converter 100 at time t5 may correspond to time t1, as well as time t6 corresponding to time t3, and time t7 to time t4. It is noted that the described operation results in a series of current pulses that are interleaved between Pulse Control Circuits 101a-101c. For a constant current demand from Load 105, the series of current pulses may occur at a constant interval. Differences between circuits and components, as well as changes in operating voltage and/or temperature, may, however, cause deviations from this interval.

It is also noted that FIG. 3 is merely an example of waveforms that may result from the example embodiments as presented in this disclosure. The waveforms are simplified to provide clear descriptions of the disclosed concepts. Shapes and levels of the waveforms may also be exaggerated for emphasis. In other embodiments, the waveforms may appear different due to various influences such as technology choices for building the circuits, actual circuit design and layout, ambient noise in the environment, choice of power supplies, etc.

Figure 4:
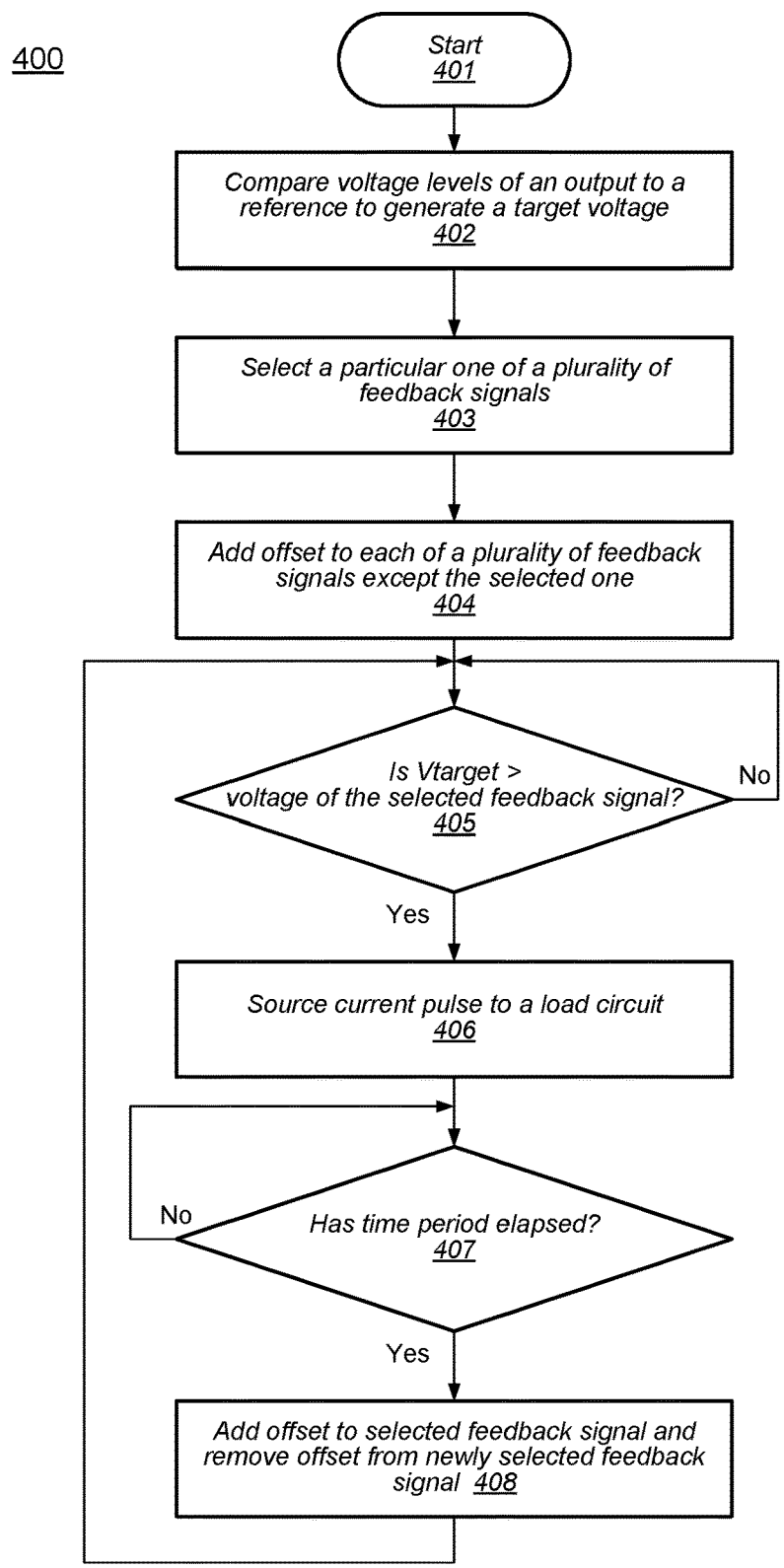
FIG. 4 illustrates a flow diagram for an embodiment of a method for operating a voltage converter.

Turning to FIG. 4, a flow diagram for an embodiment of a method for operating a voltage converter is illustrated. Method 400 may be applied to a voltage converter such as, for example, Voltage Converter 100. Referring collectively to Voltage Converter 100 in FIG. 1, and the flow diagram in FIG. 4, the method begins in block 401.

A voltage level of an output of a voltage regulator circuit is compared to reference voltage level to generate a target voltage level (block 402). Referring to FIG. 1, Gain Stage 102 receives Vout 110 and Vref 112 as input signals and generates Vtarget 113 as an output based on a comparison of the inputs. For example, in some embodiments, Gain Stage 102 may subtract the voltage level of Vout 110 from the voltage level of Vref 112 and then amplify or scale the difference to generate Vtarget 113 within a particular voltage range suitable for Pulse Control Circuits 101a-101c.

A feedback signal of a plurality of feedback signals, coupled to a respective input node of a selected pulse control circuit of a plurality of pulse control circuits, is selected (block 403). In the illustrated embodiment, one feedback signal, such as for example, Vfeedback 111a, is selected by Control Circuit 107, along with selecting the corresponding Pulse Control Circuit 101a. This selection may be based on which feedback signal of Vfeedback signals 111a-111c has not been selected for the longest amount of time. When Voltage Converter 100 is first enabled, or first enters a particular mode such as PFM mode, Control Circuit 107 may default to selecting a particular one of Vfeedback signals 111a-111c.

A respective offset is added to a voltage level of each of a plurality of feedback signals except for the selected feedback signal (block 404). Control Circuit 107 asserts Enable signals 117 and 117c, thereby causing Offset Generators 103b and 103c to generate respective offset voltages to respective feedback signals, Vfeedback 111b and 111c. Enable signal 117a is left de-asserted and, therefore, Vfeedback 111a does not have an additional voltage offset.

Further operations of Method 400 may depend on a voltage level of the selected feedback signal and the target voltage level (block 405). Pulse Control Circuit 101a compares the voltage level of Vfeedback 111a to the voltage level of Vtarget 113. As Load 105 consumes current, the voltage level of Vout 110 may fall, thereby causing the voltage levels of each of Vfeedback 111a-111c to fall as current is supplied to Load 105 through L104a-L104c. Due to the offset voltages applied to Vfeedback 111b and 111c, however, Vfeedback 111a falls below the voltage level of Vtarget 113 before Vfeedback 111b and 111c. If the voltage level of Vfeedback 111a is less than the voltage level of Vtarget 113, the method moves to block 406 to generate a current pulse. Otherwise, the method remains in block 405.

A current pulse is sourced, by the selected pulse control circuit, to the load circuit coupled to the output of the regulator circuit (block 406). Pulse Control Circuit 101a, after determining that the voltage level of Vfeedback 111a is less than the voltage level of Vtarget 113, generates a current pulse to Load 105, via L104. To generate the current pulse, a transconductance device, such as, for example, Q225 in FIG. 3, is enabled, allowing current to flow from a power signal, such as, Vin 114 or Vin 214, through a coupled inductor, e.g., L104a or L204. If Voltage Converter 100 is operating in a PFM mode, then the on time associated with the current pulse may be based on a peak amount of current that is desired or allowed to flow through L104a.

Subsequent operations of the method may depend on an elapsed period of time (block 407). Control Circuit 107, in the illustrated embodiment, includes a timing circuit capable of indicating an end of one or more time periods. The time period may begin when the voltage level of Vfeedback 111a is detected to be less than the level of Vtarget 113. In various other embodiments, the time period may begin when Vfeedback 111a is selected, or in response to the voltage level of Vfeedback 111a dropping below the level of Vtarget 113. If Control Circuit 107 receives the indication that the time period has elapsed, then the method moves to block 408 to add the offset to Vfeedback 111a. Otherwise, the method remains in block 407.

An offset is added to the voltage level of the current selected feedback signal, and the offset is removed from a voltage level of a newly selected feedback signal coupled to a newly selected pulse control circuit of the plurality of pulse control circuits (block 408). In the illustrated embodiment, after determining that the time period has elapsed, Control Circuit 107 asserts Enable signal 117a, thereby Enabling Offset Generator 103a and adding the offset voltage level to Vfeedback 111a. Control Circuit 107 also selects a new pulse control circuit and feedback signal, such as Pulse Control Circuit 101b and Vfeedback 111a. In other embodiments, Control Circuit 107 may instead select Pulse Control Circuit 101c and Vfeedback 111c. While the particular order of selection of the pulse control circuits may be arbitrary, the order, once established, may remain constant such that the pulse control circuit that has had the longest time since being selected is the next to be selected at the end of the time period. The assertion of Enable signal 117a and the de-assertion of Enable signal 117b may occur at a same time based on the indicated end of the time period. In other embodiments, separate timing circuits may be utilized such that the relative timing for the assertion and the de-assertion may be selected independently, with either one occurring first. The method returns to block 405 to determine if the voltage level of the newly selected feedback signal is below the target voltage level.

It is noted that the method illustrated in FIG. 4 is one example. In various other embodiments, additional operations may be included and some operations may be performed in parallel or in a different sequence.

FIG. 4 describes one method for operating the embodiment of Voltage Converter 100 in FIG. 1. The embodiments disclosed above include offset generator circuits that are either disabled, thereby adding no offset voltage to feedback signals, or enabled and add a single offset voltage to the feedback signals. Another method for operating Voltage Regulator 100 is contemplated. In this other method, described below in regards to FIGS. 5 and 6, each Offset Generator 103a-103c is capable of adding either a full offset voltage or a partial offset voltage to the corresponding Vfeedback signal 111a-111c.

Figure 5:
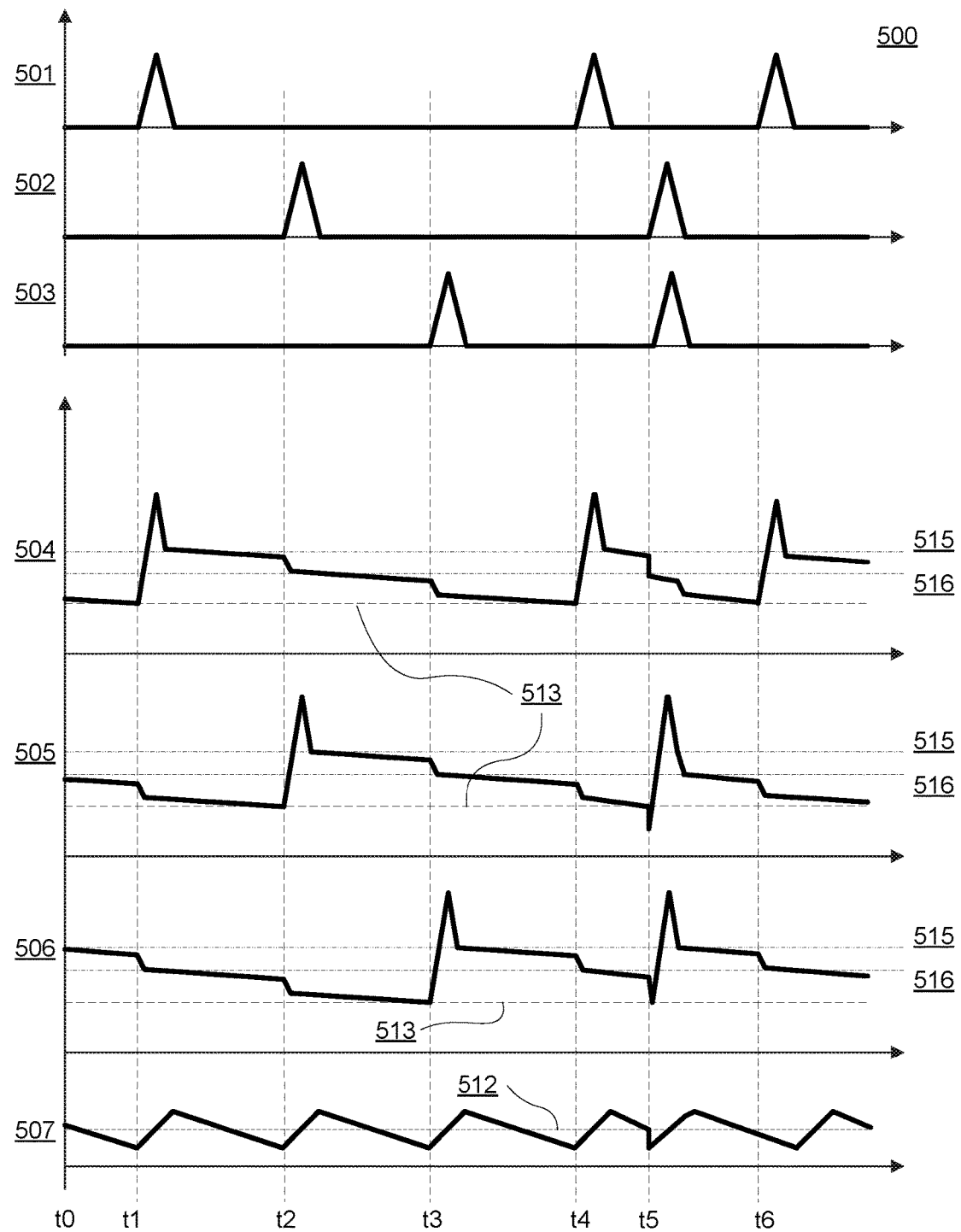
FIG. 5 shows a chart depicting waveforms for another embodiment of a voltage converter.

FIG. 5 illustrates a chart showing the same waveforms as Chart 300 in FIG. 3, except related to the optional embodiment of Voltage Converter 100. Chart 500 includes Current waveforms 501-503, Vfeedback waveforms 504-506, and Vout waveform 507, all corresponding to the same signals as waveforms 301-307 in Chart 300. The same three reference voltage levels (illustrated as dashed lines) are shown, Vref 512, Vtarget 513, and Voffset 515. In addition, Vpartial 516 is included, representing an additional offset voltage level that is less than Voffset 515. Referring to FIGS. 1 and 5, Chart 500 begins at time t0, with Voltage Converter 100 operating in PFM mode In the illustrated embodiment, Voltage Converter 100 is between current pulses, with a last current pulse having been sourced by Pulse Control Circuit 101c. Vfeedback 504 (corresponding to Vfeedback 111a) has no additional offset voltage, Vfeedback 505 (corresponding to Vfeedback 111b) has Vpartial 516 added, and Vfeedback 506 (corresponding to Vfeedback 111c) has a Voffset 515 added.

It is noted that, in the current embodiment, each of Enable signals 117a-117c indicate more than one offset voltage level. In various embodiments, each of Enable signals 117a-117c may include more than one wire between Control Circuit 107 and the respective Offset Generator 103a-103c, may send a digital value serially to a respective Offset Generator 103a-103c, may send an analog signal to Offset Generator 103a-103c to indicate a selected voltage level, or may use another suitable method for indicating a selected voltage level.

At time t1, the voltage level of Vfeedback 504 falls below the voltage level of Vtarget 513, causing Pulse Control Circuit 101a to source a current pulse to Load 105 as shown by Current 501. Control Circuit 107 adjusts each of Enable signals 117a-117c such that the Vpartial 516 is removed from Vfeedback 505, Voffset 515 is changed to Vpartial 516 on Vfeedback 506, and Voffset 515 is added to Vfeedback 504. Control Circuit 107 may change the values of Enable signals 117a-117c in direct response to the current pulse, or may delay for an amount of time from the initiation of the current pulse before making changes to Enable signals 117a-117c. In some embodiments, Control Circuit 107 may include multiple timing circuits for indicating multiple amounts of time such that the various Enable signals 117a-117c may be changed at different times.

In the illustrated embodiment, at time t2, the voltage level of Vfeedback 505 drops below the level of Vtarget 513. In response, Pulse Control Circuit 101b generates a current pulse as shown by Current 502. Control Circuit 107 modifies values of Enable signals 117a-117c such that Vfeedback 506 has no added offset, Vfeedback 504 has Vpartial 516 added, and Vfeedback 505 has Voffset 515 added. In other words, the three different offset voltage levels (zero, partial, and full) are cycled to a next feedback signal. At time t3, the voltage level of Vfeedback 506 falls below the level of Vtarget 513, and the three offset voltage levels are cycled again. Vfeedback 506 receives Voffset 515, Vfeedback 505 receives Vpartial 516 and Vfeedback 504 receives no offset. At time t4, Vfeedback 504 falls below Vtarget 513 and the state of the offset voltages returns to a same state as at time t1, repeating the cycle.

It is noted that, although three offset voltage levels are disclosed in the illustrated embodiment, more voltage levels may be used. For example, in an embodiment with more than three pulse control circuits and respective offset generators, the number of offset voltage levels may equal the number of pulse control circuits. In other embodiments, the number of offset voltage levels may exceed the number of pulse control circuits, and the control circuit may select particular offset voltage levels based on a current operating state and/or current demand from a load circuit.

At time t5, Load 105, in the illustrated embodiment, has a sudden increase in current demand, causing a sharp drop in the voltage level of Vout 507. This sudden drop in the level of Vout 110 causes corresponding drops in the levels of feedback signals Vfeedback 504-506. Since Vfeedback 505 does not have an applied offset voltage, the voltage level of Vfeedback 505 is the lowest of the three feedback signals and, therefore, the first to drop below the voltage level of Vtarget 513. In response to the level of Vfeedback 505 falling below the level of Vtarget 513, Pulse Control Circuit 101b sources a current pulse as shown by Current 502. Vfeedback 506, with Vpartial 516 applied, has a lower voltage level than Vfeedback 504. The drop in Vout 507 is enough to cause the voltage level of Vfeedback 506 to fall below the voltage level of Vtarget 513 shortly after Vfeedback 505. In response to the level of Vfeedback 506 falling below the level of Vtarget, Pulse Control Circuit 101c sources a current pulse as shown in Current 503. The added voltage level of Voffset 515 to Vfeedback 504 prevents the voltage level of Vfeedback 504 from falling below the voltage level of Vtarget 513, and Pulse Control Circuit 101a, therefore, does not source a current pulse in response to the sudden drop in the voltage level of Vout 507. Since both Pulse Control Circuits 101b and 101c generated current pulses in response to the voltage level drop of Vout 507, Control Circuit 107 cycles the offset voltages such that Vpartial 516 is removed from Vfeedback 504 and added to Vfeedback 505, and Voffset 515 is added to Vfeedback 506.

In the illustrated embodiment, at time t6, the level of Vfeedback 504 drops below the level of Vtarget 513, causing Pulse Control Circuit 101a to source a current pulse and Control Circuit 107 to cycle Enable signals 117a-117c to a similar state as at time t1. This cycle may continue while Voltage Converter 100 continues to operate in PFM mode.

It is noted that the use of an interleaved voltage offset on the illustrated pulse control circuits allows all of the pulse control circuits to remain active, and, therefore, capable of responding to a sudden change in current demand, while also controlling an order in which these circuits generate current pulses. Furthermore, the addition of the partial offset voltage may allow for greater control of how the pulse control circuits respond to sudden changes in current demand from a load circuit. In the illustrated example of FIG. 5, the sudden drop of Vout 507 at time t5 is large enough to cause two of the three pulse control circuits to generate current pulses in a short time to compensate for the sudden current demand. The drop of Vout 507, however, did not trigger the third pulse control circuit. This graduated response may, in some embodiments, prevent a voltage overshoot on Vout 507 due to all pulse control circuits generating current pulses in response to the voltage drop of Vout 507. Additionally, if the sudden current demand had been more severe and the level of Vout 507 dropped lower, then the third pulse control circuit may have been triggered and generated an additional current pulse to compensate for the higher level of current demand from the load circuit.

It is also noted that FIG. 5 is an example of waveforms associated with the example embodiments presented herein. As described in regards to FIG. 5 above, the waveforms are simplified to provide clear descriptions of the disclosed embodiments. In various embodiments, the waveforms may be shaped differently due to various parameters and conditions of the components and environment associated with the circuits.

Figure 6:
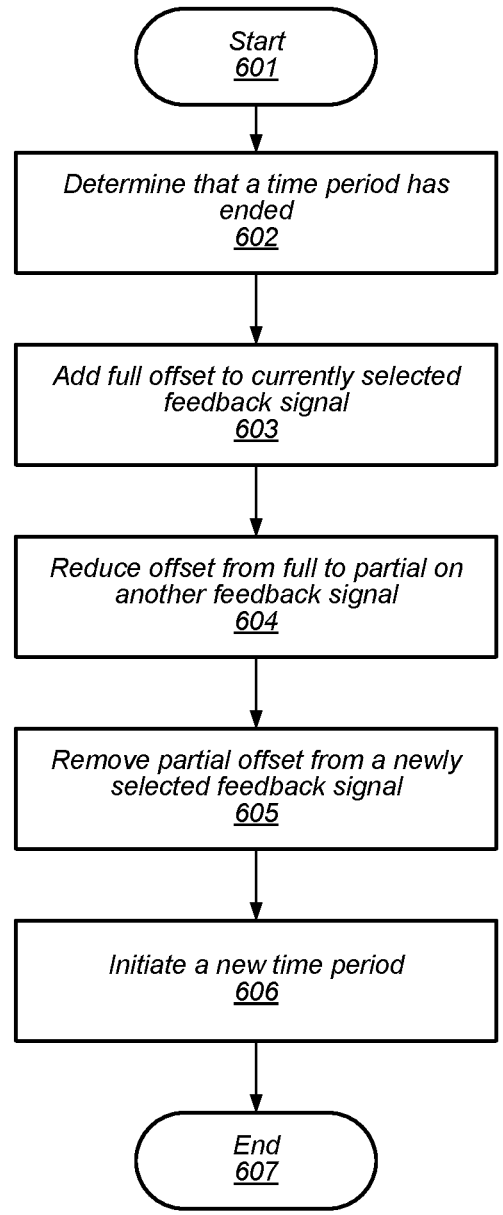
FIG. 6 depicts a flow diagram for another embodiment of a method for operating a voltage converter.

Proceeding to FIG. 6, a flow diagram for an embodiment of a method for operating a voltage converter in the first operational mode is illustrated. Method 600 may be applied to a voltage converter such as, for example, Voltage Converter 100. In some embodiments, Method 600 may correspond to operations performed in block 408 of Method 400 in FIG. 4. Referring collectively to FIGS. 1 and 5, and to the flow diagram in FIG. 6, the method begins in block 601 with Voltage Converter 100.

A determination is made that a time period has ended (block 602). Control Circuit 107, in the illustrated embodiment, determines that a particular time period has ended. In various embodiments, the time period may be based on a start of a current pulse by one of Pulse Control Circuits 101a-101c, and end of a current pulse by one of Pulse Control Circuits 101a-101c, an elapsed time from when an offset voltage was removed from a particular one of Vfeedback signals 111a-111c, or any other suitable occurrence. In some embodiments, Control Circuit 107 includes one or more timer circuits for determining elapsed times.

A full offset voltage is added to a currently selected feedback signal (block 603). Referring to the embodiment illustrated in Chart 500, at time t1, Vfeedback 504 (corresponding to Vfeedback 111a in FIG. 1) is selected and generates a current pulse. At a point in time after the current pulse is initiated, Control Circuit 107 adjust Enable signal 117a such that Voffset 515 is added to the selected Vfeedback 504. As used herein, "full offset voltage" and "full offset" refer to a voltage level of an offset voltage generated by an offset generator circuit such as, e.g., Offset Generators 103a-103c. A full offset voltage refers to a largest voltage level that an offset generator circuit may apply to a feedback signal.

Reduce offset from full to partial on another feedback signal (block 604). Referring again to Chart 500 at time t1, Control Circuit 107 adjust Enable signal 117c in order to reduce the offset voltage on Vfeedback 506 (corresponding to Vfeedback 111c) from Voffset 515 to Vpartial 516. A "partial offset voltage" or simply "partial offset" refers to, as used herein, an offset voltage level produced by an offset generator circuit that may be applied to any feedback signal in a voltage regulator circuit such as Voltage Converter 100. A partial offset voltage has a voltage level that is between a level of a full offset voltage and a zero voltage level.

A partial offset is removed from a newly selected feedback signal (block 605). In the illustrated embodiment, at time t1 in Chart 500, Control Circuit 107 adjust Enable signal 117b in order to remove the partial offset voltage, Vpartial 516 from Vfeedback 505 (corresponding to Vfeedback 111b). Removing the offset voltage from Vfeedback 111b correspond to selecting Vfeedback 111b, and therefore Pulse Control Circuit 101b, for generating a next current pulse.

A new time period is initiated (block 606). In some embodiments, a new time period may be initiated in response to removing the partial offset voltage from the newly selected feedback signal, i.e., Vfeedback 505. In other embodiments, the new time period may be initiated in response to the voltage level of Vfeedback 505 dropping below the level of Vtarget 513. The method ends in block 607.

It is noted that Method 600 in FIG. 6 is an example embodiment. Variations of the example embodiment are contemplated and may include additional operations. In other embodiments, some operations may be performed in parallel or in a different sequence. For example, blocks 603 through 605 may be performed in any suitable order, including in parallel.

Figure 7:
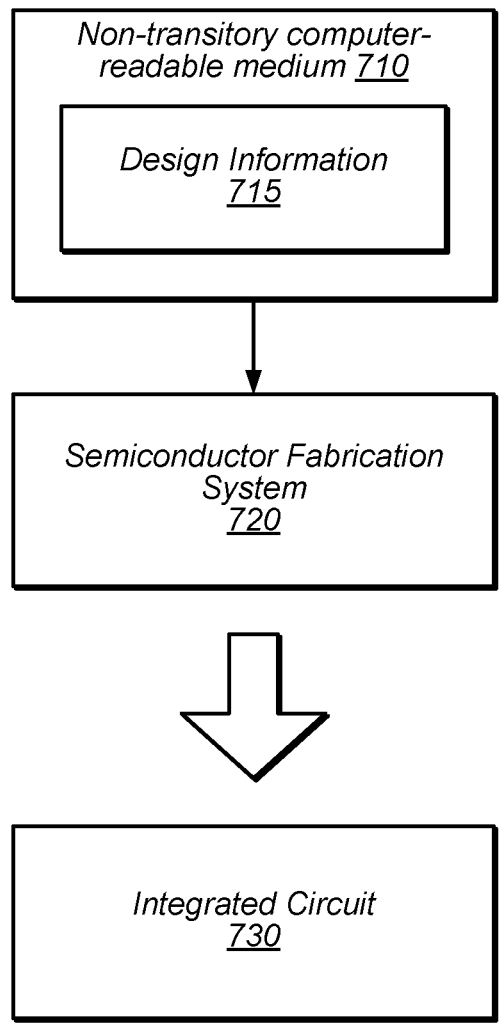
FIG. 7 illustrates a block diagram of a system for generating an integrated circuit (IC) using a computing device and a computer-readable storage medium.

FIG. 7 is a block diagram illustrating an example non-transitory computer-readable storage medium that stores circuit design information, according to some embodiments. The embodiment of FIG. 7 may be utilized in a process to design and manufacture integrated circuits, such as, for example, Voltage Converter 100 of FIG. 1. In the illustrated embodiment, semiconductor fabrication system 720 is configured to process the design information 715 stored on non-transitory computer-readable storage medium 710 and fabricate integrated circuit 730 based on the design information 715.

Non-transitory computer-readable storage medium 710, may comprise any of various appropriate types of memory devices or storage devices. Non-transitory computer-readable storage medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 710 may include other types of non-transitory memory as well or combinations thereof. Non-transitory computer-readable storage medium 710 may include two or more memory mediums, which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system, such as semiconductor fabrication system 720, for example. In some embodiments, design information 715 may include a netlist that specifies elements of a cell library, as well as their connectivity. One or more cell libraries used during logic synthesis of circuits included in integrated circuit 730 may also be included in design information 715. Such cell libraries may include information indicative of device or transistor level netlists, mask design data, characterization data, and the like, of cells included in the cell library.

Integrated circuit 730 may, in various embodiments, include one or more custom macrocells, such as memories, analog or mixed-signal circuits, and the like. In such cases, design information 715 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown or described herein. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a plurality of pulse control circuits, wherein a given pulse control circuit of the plurality of pulse control circuits is configured to source a current pulse to an output power signal based on a comparison of a particular feedback signal of a plurality of feedback signals and a target voltage signal;
a control circuit configured to:
offset a voltage level of each feedback signal of a first subset of the plurality of feedback signals, wherein the first subset excludes a first feedback signal; and
in response to a determination that a period of time has ended, offset a voltage level of each feedback signal of a second subset of the plurality of feedback signals, wherein the second subset includes the first feedback signal and excludes a second feedback signal.

2. The apparatus of claim 1, wherein to source the current pulse to the output power signal, the give pulse control circuit is further configured to generate the current pulse in response to a determination that a voltage level of the particular feedback signal is less than a voltage level of the target voltage signal.

3. The apparatus of claim 1, wherein to offset the voltage level of each feedback signal of the first subset, the control circuit is further configured to increase a voltage level of a particular feedback signal included in the first subset.

4. The apparatus of claim 1, wherein to offset the voltage level of each feedback signal of the first subset, the control circuit is further configured to increase a voltage level of a particular feedback signal included in the first subset by a first amount, and increase a voltage level of another feedback signal included in the first subset by a second amount different than the first amount.

5. The apparatus of claim 1, wherein the control circuit is further configured to track the period of time starting from when a corresponding voltage is offset from a last one of the first subset of the plurality of the feedback signals.

6. The apparatus of claim 1, wherein a length of the period of time is based on a number pulse control circuit included in the plurality of pulse control circuits.

7. The apparatus of claim 1, further comprising a gain stage configured to generate the target voltage level using the output power signal and a reference voltage signal.

8. A method, comprising:
comparing a voltage level of an output of a regulator circuit to a reference voltage level to generate a target voltage level;
selecting a particular feedback signal of a plurality of feedback signals and a corresponding pulse control circuit of a plurality of pulse control circuits, wherein each of the plurality of feedback signals is coupled to a respective input node of a respective one of the plurality of pulse control circuits;
adding a respective offset to a voltage level of each of the plurality of feedback signals except the particular feedback signal;

based on a comparison of the voltage level of the particular feedback signal to the target voltage level, sourcing, by the corresponding pulse control circuit, a current pulse to a load circuit coupled to the output of the regulator circuit; and in response to determining a period of time has elapsed, adding a respective offset to the voltage level of the particular feedback signal, and removing the respective offset from a voltage level of a newly selected feedback signal coupled to a newly selected pulse control circuit of the plurality of pulse control circuits.

9. The method of claim 8, further comprising, based on a comparison of the voltage level of the newly selected feedback signal to the target voltage level, sourcing, by the newly selected pulse control circuit, another current pulse to the load circuit.

10. The method of claim 8, wherein a level of the respective offset added to the voltage level of the particular feedback signal is different than a level of an offset added to a voltage level of a third feedback signal coupled to a third pulse control circuit of the plurality of pulse control circuits.

11. The method of claim 10, wherein the level of the offset added to the voltage level of the particular feedback signal corresponds to a full offset voltage and the level of the offset added to the voltage level of a third feedback signal of the plurality of feedback signals corresponds to a partial offset voltage.

12. The method of claim 11, further comprising, in response to determining the period of time has elapsed, adjusting the level of the offset added to the voltage level of the third feedback signal from the full offset voltage to the partial offset voltage.

13. The method of claim 8, wherein the period of time begins when the particular feedback signal is selected.

14. The method of claim 8, wherein a length of the period of time is based on a number of pulse control circuits included in the plurality of pulse control circuits.

15. A non-transitory computer-readable storage medium having design information stored thereon, wherein the design information specifies a design of at least a portion of a hardware integrated circuit in a format recognized by a semiconductor fabrication system that is configured to use the design information to produce the hardware integrated circuit according to the design information, wherein the design information specifies that the hardware integrated circuit comprises:

a plurality of pulse control circuits, wherein a given pulse control circuit of the plurality of pulse control circuits is configured to source a current pulse to an output power signal based on a comparison of a particular feedback signal of a plurality of feedback signals and a target voltage signal;

a control circuit configured to:
offset a voltage level of each feedback signal of a first subset of the plurality of feedback signals, wherein the first subset excludes a first feedback signal; and
in response to a determination that a period of time has ended, offset a voltage level of each feedback signal of a second subset of the plurality of feedback signals, wherein the second subset includes the first feedback signal and excludes a second feedback signal.

16. The non-transitory computer-readable storage medium of claim 15, wherein to source the current pulse to the output power signal, the give pulse control circuit is further configured to generate the current pulse in response to a determination that a voltage level of the particular feedback signal is less than a voltage level of the target voltage signal.

17. The non-transitory computer-readable storage medium of claim 15, wherein to offset the voltage level of each feedback signal of the first subset, the control circuit is further configured to increase a voltage level of a particular feedback signal included in the first subset.

18. The non-transitory computer-readable storage medium of claim 17, wherein to offset the voltage level of each feedback signal of the first subset, the control circuit is further configured to increase a voltage level of a particular feedback signal included in the first subset by a first amount, and increase a voltage level of another feedback signal included in the first subset by a second amount different than the first amount.

19. The non-transitory computer-readable storage medium of claim 18, wherein the control circuit is further configured to track the period of time starting from when a corresponding voltage is offset from a last one of the first subset of the plurality of the feedback signals.

20. The non-transitory computer-readable storage medium of claim 15, wherein a length of the period of time is based on a number pulse control circuit included in the plurality of pulse control circuits.

* * * * *